United States Patent
Maltz

(10) Patent No.: US 7,054,030 B2
(45) Date of Patent: May 30, 2006

(54) SMOOTH MONOTONIC TONE REPRODUCTION CURVE END POINT ADJUSTMENT

(75) Inventor: Martin S. Maltz, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 555 days.

(21) Appl. No.: 09/817,186

(22) Filed: Mar. 27, 2001

(65) Prior Publication Data

US 2002/0140956 A1    Oct. 3, 2002

(51) Int. Cl.
*G06K 15/02*  (2006.01)
*H04N 1/58*  (2006.01)
*H04N 1/407*  (2006.01)
*H04N 1/409*  (2006.01)

(52) U.S. Cl. ............ 358/1.9; 358/3.01; 358/504; 358/521; 358/3.26

(58) Field of Classification Search ........... 358/504, 358/518, 521, 523, 1.9, 3.01, 3.26; 382/162, 382/167
See application file for complete search history.

(56) References Cited

U.S. PATENT DOCUMENTS

| 5,196,942 A | * | 3/1993 | Shiau | 358/3.1 |
| 5,345,315 A | * | 9/1994 | Shalit | 358/406 |
| 5,777,656 A | * | 7/1998 | Henderson | 347/251 |

* cited by examiner

*Primary Examiner*—Thomas D. Lee
(74) *Attorney, Agent, or Firm*—Oliff & Berridge, PLC

(57) ABSTRACT

The tone reproduction curve is smoothed to eliminate or reduce artifacts due to abrupt changes in the final system tone reproduction curve. As the tone reproduction curve approaches an end point, it is modified, if necessary, so that the angle between a tangent to the tone reproduction curve at a point, and a line from that point to the end point is less than a threshold value. The end point is considered to be a corner of a box, the threshold value is a function of the distance from the point to the nearest of the walls of the corner, and the threshold value goes to zero as the distance to the wall goes to zero. Thus, the tone reproduction curve is guided to the end point in a smooth and monotonic fashion.

12 Claims, 6 Drawing Sheets

SMOOTH MONOTONIC TONE REPRODUCTION CURVE END POINT ADJUSTMENT

BACKGROUND OF THE INVENTION

1. Field of Invention

This invention is directed toward systems and methods that adjust an image processing system tone reproduction curve.

2. Description of Related Art

An image processing system tone reproduction curve (TRC) represents what the image processing portion of the system should output in gray level given a particular gray level input. The tone reproduction curve is derived from combining the characteristics of other portions of the system. In particular, the tone reproduction curve is based on characteristics of the image data source, image output terminal and system tone reproduction curves. The resulting image processing system tone reproduction curve compensates for the image data source and image output terminal characteristics to arrive at the desired system output. In particular, image processing system tone reproduction curves are created during the product development phase and stored in data files on the actual device, or, for example, in the accompanying driver or software files. Therefore, each possible mode and each possible combination of image adjustment, such as contrast and brightness, has an associated image processing system tone reproduction curve stored in a data file. The data file corresponding to the image data source information and the image output terminal information was then referenced and applied by the image processing sub-system to the input image information. The tone reproduction curves may be created for each of colors, cyan (C), magenta (M) and yellow (Y).

SUMMARY OF THE INVENTION

In order to achieve a resulting image with high quality, and without artifacts, it is preferable that the output of the tone reproduction curve for a color reaches maximum, i.e. at 100% area coverage, when the input darkness reaches maximum, which generally occurs at zero reflectance. However, at least one of the three colors cyan, magenta and yellow may reach 100% area coverage before the other colors, and thus, may achieve gray balance to a darkness considerably less than the maximum. Thus, in comparison with the tone reproduction curves of the other colors, the end point of the at least one tone reproduction curve may not have the desired behavior at maximum.

The various exemplary embodiments of the systems and methods of this invention allow for an adjusted system tone reproduction curve. In particular, according to these exemplary embodiments, a new, adjusted tone reproduction curve is determined.

In adjusting the tone reproduction curve to adjust the end points, kinks may be created in the adjusted tone reproduction curve which may cause abrupt changes in the final system tone reproduction curve. These abrupt changes are undesirable because they could cause artifacts such as contouring in the output image. Contouring is noise resulting from defects such as coarse amplitude quantizing such that artificial colors or boundaries may develop, and slowly varying regions of images may be truncated to a limited number of gray levels.

Artifacts stemming from these abrupt changes are perceptible to the human eye, and thus are unacceptable for an output image. That is, if the image is output without adjusting for these artifacts, the output image will include the artifacts. These artifacts, even if only a few mils or tens of microns, are well within the visual acuity of the human eye. Since the human eye can sense these artifacts, the quality of the resulting image suffers greatly even for small artifacts.

In the various exemplary embodiments of the systems and methods of this invention, the tone reproduction curve is smoothed to eliminate or reduce these artifacts.

In accordance with the exemplary embodiments of the systems and methods of this invention, the tone reproduction curve is smoothed such that kinks created by the adjustment process do not cause abrupt changes in the final system tone reproduction curve.

In accordance with the exemplary embodiments of the systems and methods of this invention, as the tone reproduction curve approaches an end point, it is modified, if necessary, so that the angle between a tangent to the tone reproduction curve at a point, and a line from that point to the end point is less than a threshold value.

In accordance with various exemplary embodiments of the systems and methods of this invention, the end point is considered to be a corner of a box, the threshold value is a function of the distance from the point to the nearest of the walls of the corner, and the threshold value goes to zero as the distance to the wall goes to zero.

In accordance with the exemplary embodiments of the systems and methods of this invention, the tone reproduction curve is guided to the end point in a smooth and monotonic fashion.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
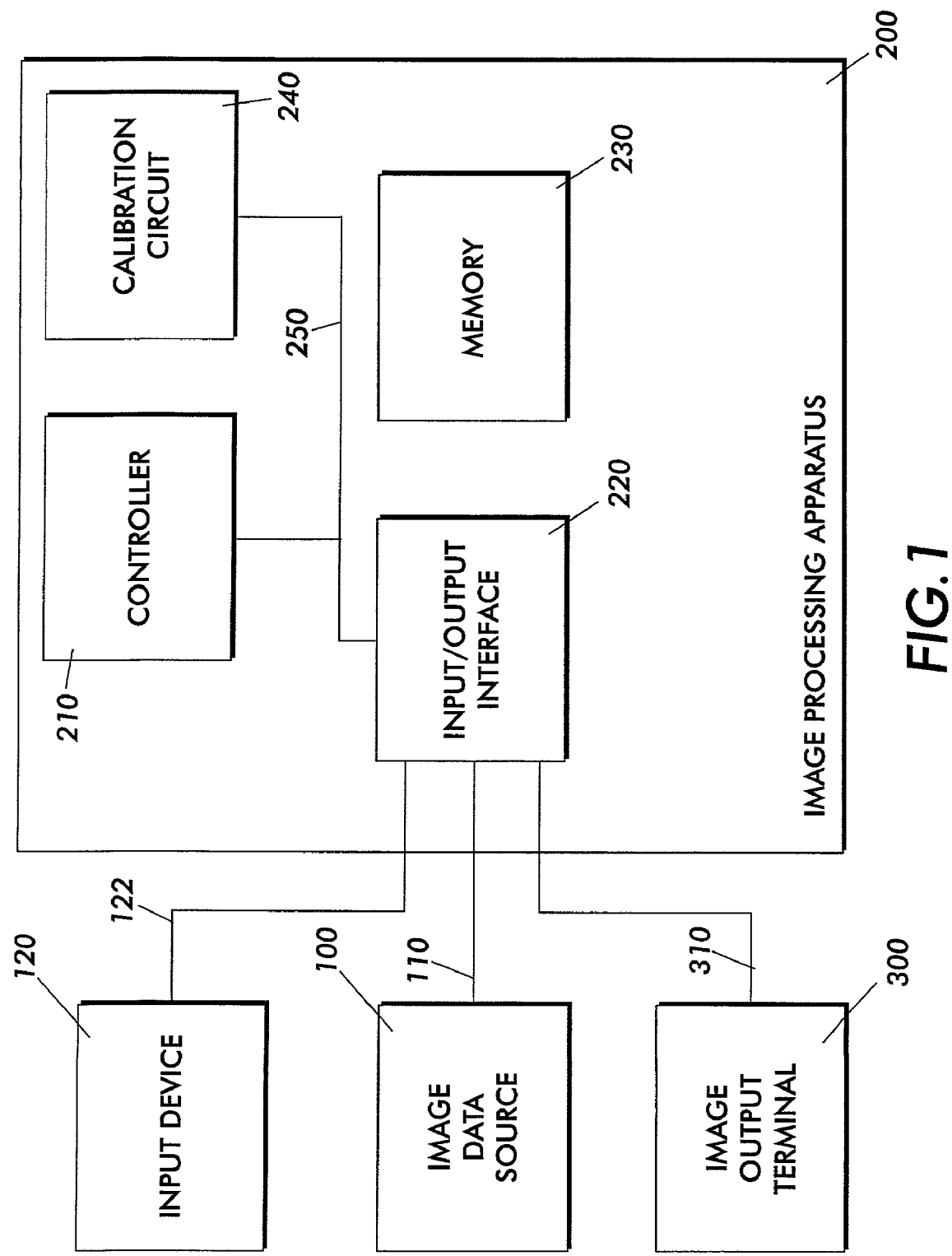
FIG. 1 is a generalized block diagram showing an exemplary embodiment of an image processing system according to this invention.

FIG. 1 shows one exemplary embodiment of an image processing apparatus 200 incorporating tone reproduction curve determination in accordance with this invention. As shown in FIG. 1, an image data source 100, an input device 120 and an image output terminal 300 are connected to the image processing apparatus 200 over links 110, 122 and 310, respectively. The image data source 100 can be a digital camera, a scanner, or a locally or remotely located computer, or any other known or later developed device that is capable of generating or otherwise providing electronic image data. Similarly, the image data source 100 can be any suitable device that stores and/or transmits electronic image data, such as a client or a server of a network.

The image data source 100 can be integrated with the image processing apparatus 200, or the image data source 100 can be connected to the image processing apparatus 200 over a connection device, such as a modem, a local area network, a wide area network, an intranet, the Internet, any other distributed processing network, or any other known or later developed connection device.

It should also be appreciated that, while the electronic image data can be generated at the time of printing an image from electronic image data, the electronic image data could have been generated at any time in the past. Moreover, the electronic image data need not have been generated from an original physical document, but could have been created from scratch electronically. The image data source 100 is thus any known or later developed device which is capable of supplying electronic image data over the link 110 to the image processing apparatus 200. The link 110 can thus be any known or later developed system or device for transmitting the electronic image data from the image data source 100 to the image processing apparatus 200.

Similarly, the image output terminal 300 can be integrated with the image processing apparatus 200, or the image output terminal can be connected to the image processing apparatus 200 over a connection device, such as a modem, a local area network, a wide area network, an intranet, the Internet, any other distributed processing network, or any other known or later developed connection device. The image output terminal 300 is thus any known or later developed device which is capable of receiving electronic image data over the link 310 from the image processing apparatus 200. The link 310 can thus be any known or later developed system or device for transmitting the electronic image data from the image processing apparatus 200 to the image output terminal.

The image processing apparatus 200 shown in FIG. 1 is connected to the image output terminal 300 over link 310. Alternatively, the image output terminal 300 may be an integral part of the image processing apparatus 200. An example of this alternative configuration would be a digital copier or the like. It should be appreciated that the image processing apparatus 200 can be any known or later developed type of image processing apparatus. There is no restriction on the form the image processing apparatus 200 can take.

The input device 120 can be any known or later developed device for providing control information from a user to the image processing apparatus 200. Thus, the input device 120 can be a control panel of the image processing apparatus 200, or could be a control program executing on a locally or remotely located general purpose computer, or the like. As with the link 110 and link 310 described above, the link 122 can be any known or later developed device for transmitting control signals and data input using the input device 120 from the input device 120 to the image processing apparatus 200.

As shown in FIG. 1, the image processing apparatus 200 includes a controller 210, an input/output interface 220, a memory 230, and a calibration circuit 240 including at least a tone reproduction curve transformation circuit, each of which is interconnected by a control and/or data bus 250. The links 110, 122 and 310 from the image data source 100, the input device 120 and the image output terminal, respectively, are connected to the input/output interface 220. The electronic image data from the image data source 100, and any control and/or data signals from the input device 120, are input through the input interface 220, and, under control of the controller 210, are stored in the memory 230 and/or provided to the controller 210.

The memory 230 preferably has at least an alterable portion and may include a fixed portion. The alterable portion of the memory 230 can be implemented using static or dynamic RAM, a floppy disk and disk drive, a hard disk and disk drive, flash memory, or any other known or later developed alterable volatile or non-volatile memory device. If the memory includes a fixed portion, the fixed portion can be implemented using a ROM, a PROM, an EPROM, and EEPROM, a CD-ROM and disk drive, a DVD-ROM and disk drive, a writable optical disk and disk drive, or any other known or later developed fixed memory device.

The links 110, 122 and 310 can be any known or later developed device or system for connection, including a direct cable connection, a connection over a wide area network or a local area network, a connection over an intranet, a connection over the Internet, or a connection over any other distributed processing network or system. In general, the links 110, 122 and 310 can be any known or later developed connection system or structure usable for connection.

The calibration circuit 240 inputs signals from the image data source 100 and calibrates the image data using an appropriate tone reproduction curve, for example, based on the input signals and control signals from the image data source 100, the image output terminal 300 and the input device 120. The calibration circuit 240 then calibrates the image data to arrive at the desired system output, and outputs the calibrated image data to the image output terminal 300 over link 310. That is, based on the calibration made by the calibration circuit 240, the calibration circuit 240 controls the output of image signals to the image output terminal 300. Accordingly, when the output images are output to the image output terminal 300, the resulting image will be output on a receiving substrate or display with the eliminated or reduced image artifacts.

In one exemplary embodiment of the systems and methods of this invention, based on the characteristics of the image data source 100 and the image output terminal 300, and upon receiving control signals via the input device 120 indicating a user's selection of a particular mode of processing for the image processing device, such as photo, fine halftone, text, line art, or the like, the calibration circuit 240 references a nominal system tone reproduction curve stored in the memory 230 for the image data. The calibration circuit 240 then makes adjustments to this nominal tone reproduction curve, such as contrast or brightness. That is, the calibration circuit 240 determines and adjusts a system tone reproduction curve to be used to output the calibrated image data to the image output terminal 300.

While FIG. 1 shows the calibration circuit 240 and the image processing apparatus 200 as portions of an integrated system, the calibration circuit 240 could be provided as a separate device from the image processing apparatus 200. That is, the calibration circuit 240 may be a separate device attachable upstream of a stand-alone image processing apparatus 200. For example, the calibration circuit 240 may be a separate device which interfaces with both the image data source 100 and the image processing apparatus 200.

Furthermore, the calibration circuit 240 may be implemented as software on the image processing apparatus 200 or the image data source 100. Other configurations of the elements shown in FIG. 1 may be used without departing from the spirit and scope of this invention.

Figure 2:
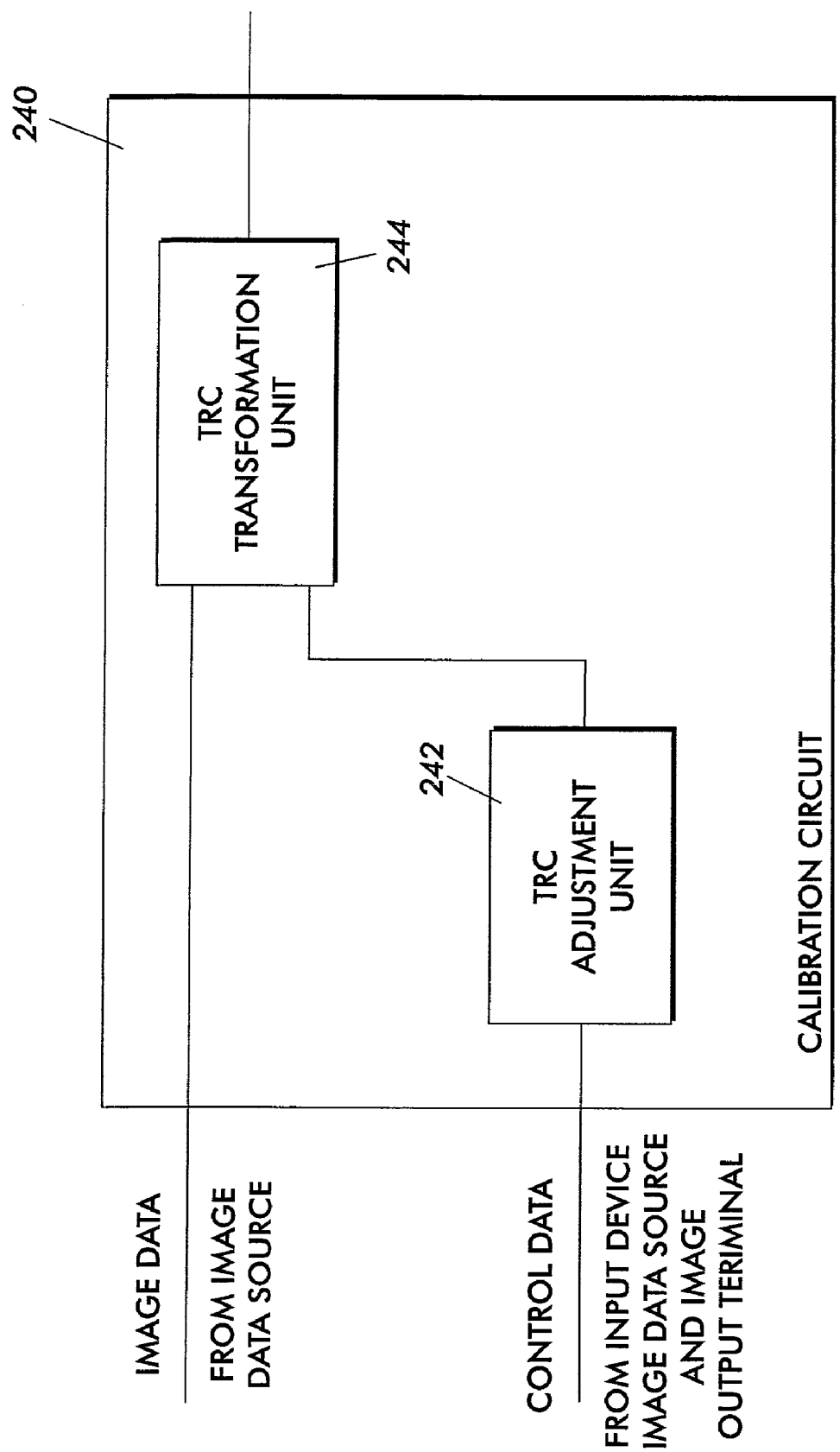
FIG. 2 shows one embodiment of a preferred calibration circuit according to this invention.

FIG. 2 shows one embodiment of a preferred calibration circuit according to this invention. As shown in FIG. 2, the calibration circuit 240 includes a tone reproduction curve adjustment unit 242 and a tone reproduction curve transformation unit 244.

The tone reproduction curve adjustment unit 242 inputs control data, such as the stiffness function, received from the input device 120, and control data received from the image data source 100 and the image output terminal 300, such as the characteristics of the image data source 100 and the image output terminal 300, and determines an initial tone reproduction curve. The tone reproduction curve adjustment unit 242 derives the initial tone reproduction curve from the gray balance. The tone reproduction curve adjustment unit 242, using the gray balance, and the different darkness of the various colors, adjusts the tone reproduction curve. The tone reproduction curve transformation unit 244 inputs the image data received from the image data source 100 and the adjusted tone reproduction curve from the tone reproduction curve adjustment unit 242 to output calibrated image data to the image output terminal 300.

Figure 3:
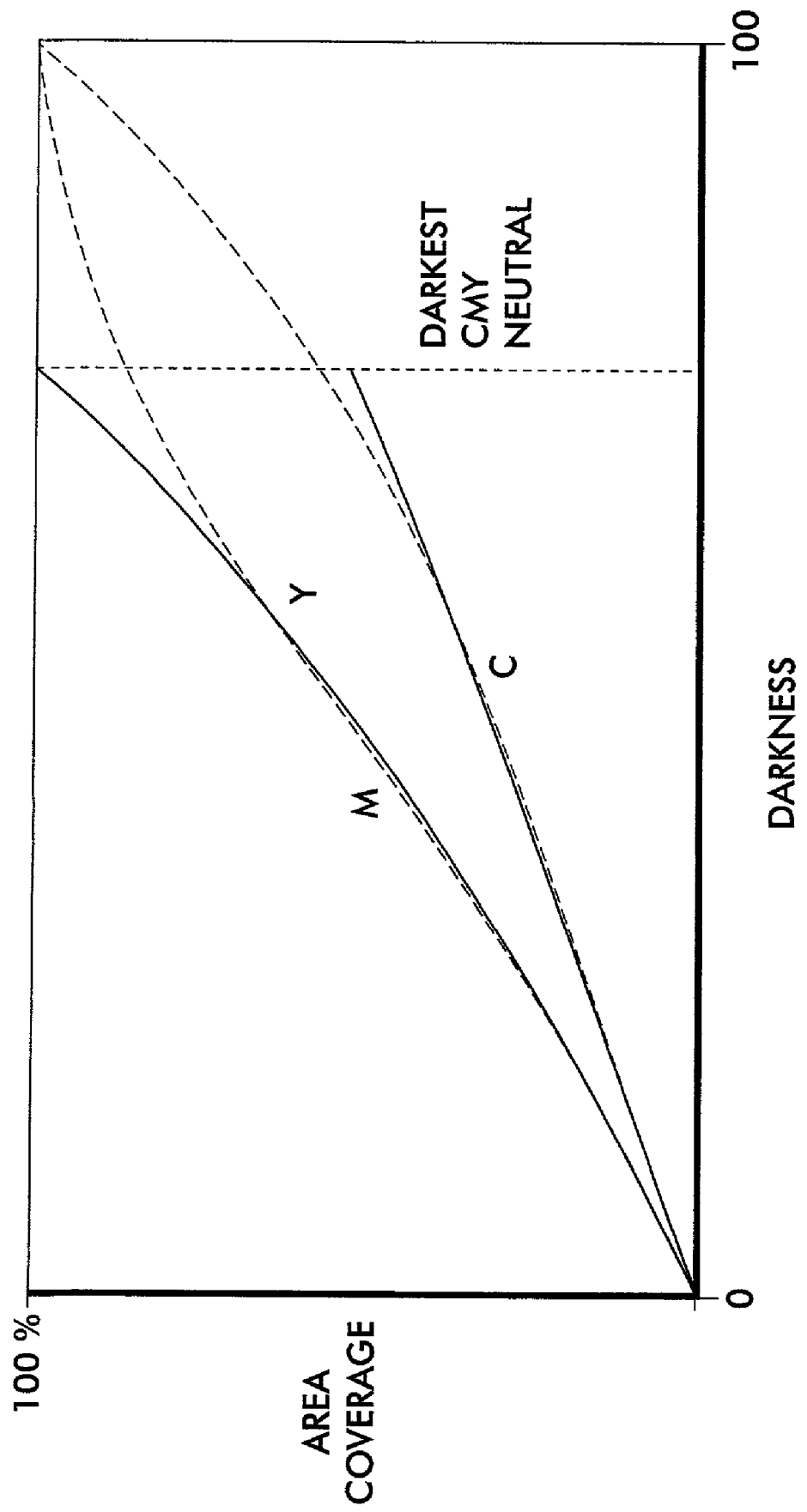
FIG. 3 shows one exemplary plot of an initial tone reproduction curve.

FIG. 3 shows one exemplary plot of an initial set of gray balanced tone reproduction curves (the solid lines). In this plot, the vertical axis is the outputted amount of cyan, magenta, and yellow colorant required to produce a neutral gray, and the horizontal axis is the darkness of the neutral gray produced. The amount of colorant can be measured many ways. An image output terminal may use halftone dot area to control the amount of colorant outputted, in which case the amount of colorant is commonly measured by the percentage of the area that is covered by the halftone dots. The vertical axis is therefore labeled "area coverage". The darkness can be also be measured many ways. A common metric is 100–L*, where L* is the CIE measure of lightness. For this metric, a darkness of zero corresponds to white paper, and a darkness of 100 corresponds to a region of zero reflectance. The horizontal axis is labeled consistent with this metric.

Using these tone reproduction curves would give an image processing system with an identity response up to the darkest CMY neutral. In otherwords, for any darkness input to the tone reproduction curve transformation unit 244 less than this limit, the darkness of the output would be equal to the darkness input. In other words, using an input to the cyan, magenta and yellow curves as a darkness of 50, the output of these curves is a set of cyan, magenta and yellow halftone dot area coverage values which, when outputted, give a neutral patch with a darkness of 50.

In determining tone reproduction curves, cyan-magenta-yellow combinations that give gray are determined, and then plotted in relation to the darkness of the gray patches these combinations would produce. As illustrated in FIG. 3, each resulting plot is a solid curve.

In accordance with the various exemplary embodiments of the methods and systems of this invention, the tone reproduction adjustment unit 242 smoothly extends the tone reproduction curves for cyan, magenta and yellow, selected by the tone reproduction curve adjustment circuit 242, to the (100, 100) corner. Since lower density neutrals are often made with cyan, magenta and yellow, it is not necessary to modify the cyan, magenta and yellow curves much at the low darkness end at the (0, 0) corner. Black is normally used to make darker neutrals, and thus, smoothness is more important at the high darkness end at the (100, 100) corner. As shown in FIG. 3, the dashed lines are an example of a set of desirable tone reproduction curves to be obtained by the tone reproduction curve adjustment unit 242.

In an exemplary embodiment, a spline function is applied by the tone reproduction curve adjustment unit 242 to extrapolate additional points to extend the solid curves shown in FIG. 3 until they reach the "walls" of the bounding box of the graph. As shown in FIG. 3, for example, to smoothly extend the tone reproduction curve for cyan, which does not reach the darkness=100 point, a spline function is used to provide the points missing to this point. A spline function is a smooth polynomial interpolation and extrapolation function well known to those skilled in the art.

Figure 4:
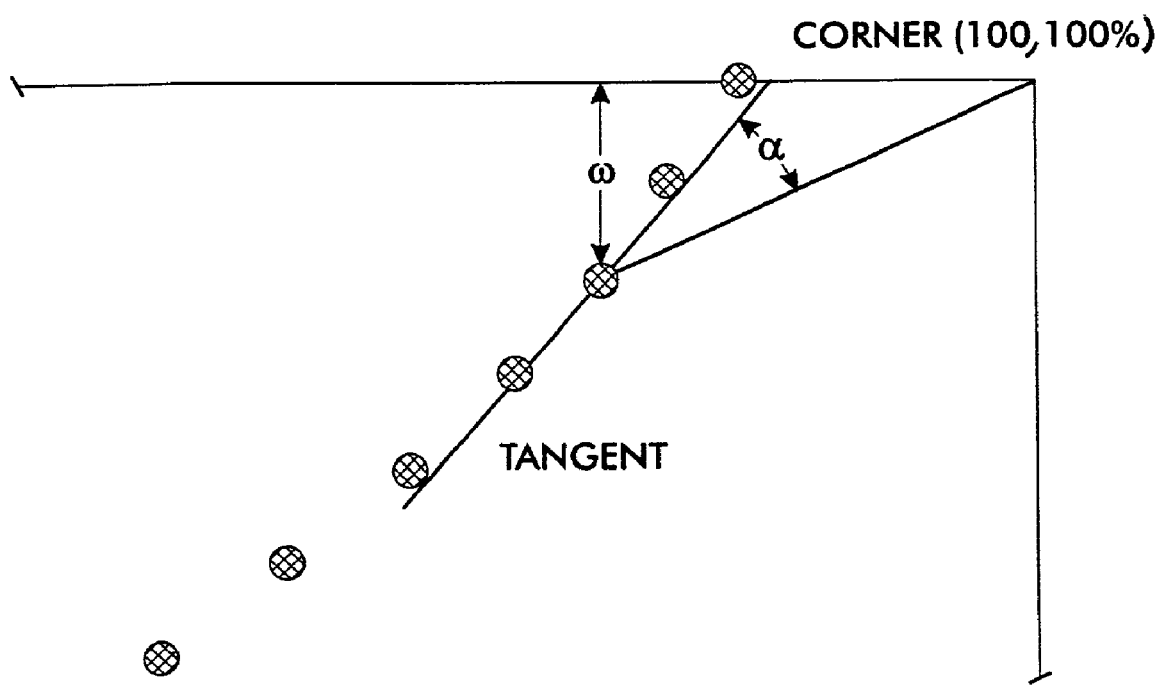
FIGS. 4 and 5 show in detail one exemplary plot of a curve used in the tone reproduction curve adjustment operation according to this invention.
Figure 5:
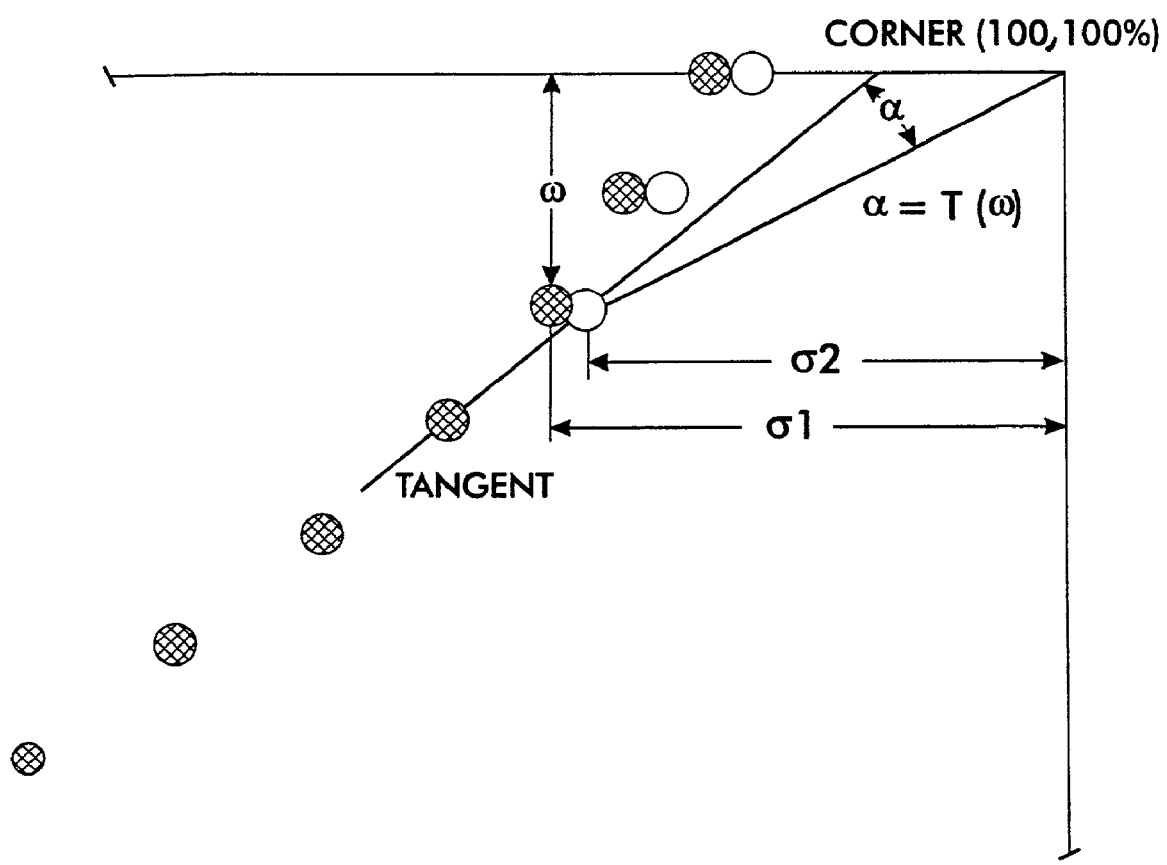

FIGS. 4 and 5 shows in detail one exemplary plot of a curve used in the tone reproduction curve adjustment operation according to this invention. Darkness values are determined for area coverage values from 0% to 100% at 1% increments. As shown in FIG. 4, for each point in the curve received from the tone reproduction curve adjustment unit 242, the tone reproduction curve adjustment unit 242 determines an angle, $\alpha$, between the tangent to the curve at the point, and a line drawn from that point to the end point at the (100, 100) corner. The tangent is determined from the position of the point of interest, and the adjacent point in the curve that is further from the end point at the (100, 100) corner. For each point, the tone reproduction adjustment unit 242 compares the angle $\alpha$ to the threshold angle T, which is a function of the distance from the point of interest to the nearest wall of the corner. As shown in FIG. 4, this distance is $\omega$. This threshold function, $T(\omega)$, is determined based on the control signals input from the input device 120 indicating a user's selection.

When $T(\omega)>\alpha$, the tone reproduction adjustment unit 242 does not modify the point. When $T(\omega)<\alpha$, however, the tone reproduction adjustment unit 244 moves the point to reduce $\alpha$ to $T(\omega)$. T normally goes to zero as $\omega$ goes to zero, thus, as is preferred, the curve is directed to the (100, 100) corner as it approaches either wall. The region of $\omega$ where T remains small therefore determines the extent of the end point correction region. Where T is large, the curve is not modified. $T(\omega)$ can therefore also be thought of as the curve flexibility function.

As shown in FIG. 5, the tone reproduction adjustment unit 242 modifies the location of the point when $T(\omega)<\alpha$. In FIG. 5, the unmodified points are solid, and the modified ones are shaded. The point of interest is moved parallel to the closer wall until $\alpha=T(\omega)$. The remaining unprocessed points in the curve, that is, the points between the point of interest and the (100, 100) corner, are moved proportionately to avoid kinks. In FIG. 5, $\sigma 2$ represents the point's new distance to the further wall, while $\sigma 1$ represents the point's old distance to the further wall. As shown in FIG. 5, the tone reproduction adjustment unit 242 moves the points so that the ratio between the points' new and old distance to the furthest wall of the corner ($\sigma 2/\sigma 1$) is the same as the corresponding ratio for the point of interest.

The tone reproduction adjustment unit 242 repeats the entire analysis for each subsequent point. The analysis begins with the furthest point from the (100, 100) corner, where $T(\omega)$ is generally set to 360 degrees, so that no curve modification takes place, and progresses towards the (100, 100) corner point by point.

The exemplary embodiments of the systems and methods of this inventions provide adjusted tone reproduction curves that are smooth, monotonic, and reasonably well behaved.

Though FIGS. 4 and 5 show that the (100, 100) corner is used, it should be appreciated that other exemplary embodiments of the systems and methods of this invention are directed to an operation that can be used by adjusting the end points of a curve in any of the corners of the curve's bounding box. It should be appreciated that systems and methods of this invention need not be applied to all the points on the curve, and that application of points far from the corner may be omitted.

Once the adjusted tone reproduction curve is determined by the tone reproduction curve adjustment unit 242, and the tone reproduction curve is smoothed such that the corners created by the adjustment process do not cause abrupt changes in the final system tone reproduction curve, the tone reproduction curve transformation unit calibrates the image data based on the adjusted tone reproduction curve. Specifically, the calibration circuit 240 uses the smoothed tone reproduction curve to manipulate the image data received from the image data source 100. The calibrated image can then be output to the image output terminal 300.

An exemplary embodiment of the image adjustment of the systems and methods of this invention is outlined in detail below with respect to FIG. 6.

Figure 6:
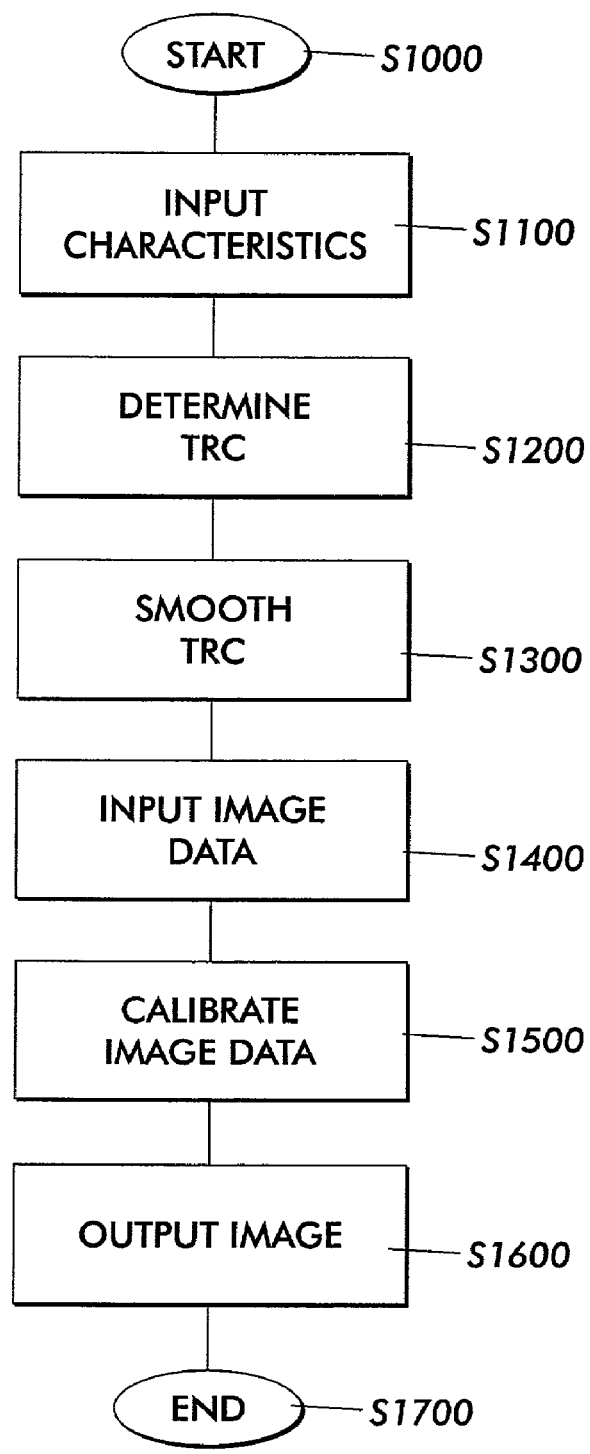
FIG. 6 is a flowchart outlining one exemplary embodiment of a method for image processing according to this invention.

FIG. 6 is a flowchart outlining an image processing method according to this invention. Beginning at step S1000, control continues to step S1100, where image data source characteristics and image output terminal characteristics are received. Control then continues to step S1300. Then, in step S1200, a tone reproduction curve is determined based on the received image data source characteristics and image output terminal characteristics. Next, in step S1300, the tone reproduction curve is smoothed. That is, as the tone reproduction curve approaches an end point, it is modified, if necessary, so that the angle between a tangent to the tone reproduction curve at a point, and a line from that point to the end point is less than a threshold value. The end point is considered to be a corner of a box, the threshold value is a function of the distance from the point to the nearest of the walls of the corner, and the threshold value goes to zero as the distance to the wall goes to zero. Control then continues to step S1400.

In step S1400, the input image information is received. Then, in step S1500, the image data is adjusted using the smoothed tone reproduction curve. Next, in step S1600, the adjusted image data is output to the image output terminal where the image is output. Control then continues to step S1700 where the control sequence ends.

The image processing apparatus 200 shown in FIG. 1 is preferably implemented on a programmed general purpose computer. However, the image processing apparatus 200 shown in FIG. 1 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIG. 6, can be used to implement the image processing apparatus 200.

In particular, it should be understood that each of the circuits shown in FIG. 1 can be implemented as portions of a suitably programmed general purpose computer. Alternatively, each of the circuits shown in FIG. 1 can be implemented as physically distinct hardware circuits within an ASIC, or using a FPGA, a PDL, a PLA or a PAL, or using discrete logic elements or discrete circuit elements. The particular form each of the circuits shown in FIG. 1 will take is a design choice and will be obvious and predicable to those skilled in the art.

The memory 230 is preferably implemented using static or dynamic RAM. However, the memory 230 can also be implemented using a floppy disk and disk drive, a writable optical disk and disk drive, a hard drive, flash memory or any other known or later developed alterable volatile or non-volatile memory device or system.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for processing an image, comprising:
inputting characteristics of an image data source;
inputting characteristics of an image output terminal;
determining a system tone reproduction curve based on the image data source characteristics and the image output terminal characteristics;
adjusting the tone reproduction curve;
inputting image data; and
adjusting the image data based on the adjusted tone reproduction curve,
wherein an angle formed between a tangent to at least one tone reproduction curve at a point, and a line from the point to an end point is less than a threshold value, the end point is considered to be a corner of a box, the threshold value is a function of a distance from the point to a nearest wall of the corner, and the threshold value going to zero as the distance to the wall goes to zero.

2. The method according to claim 1, wherein the tone reproduction curve is adjusted using gray balance.

3. The method according to claim 2, wherein the tone reproduction curve is adjusted using different darkness of various colors of the image data.

4. The method according to claim 1, wherein a tone reproduction curve is determined for each of various colors of the image data.

5. The method according to claim 4, wherein the tone reproduction curve for each of the various colors is extended smoothly.

6. The method according to claim 5, wherein a spline function is applied to extend at least one tone reproduction curve.

7. An apparatus for processing an image, comprising:
a tone reproduction curve adjustment unit that inputs characteristics of an image data source and characteristics of an image output terminal, that determines a system tone reproduction curve based on the image data source characteristics and the image output terminal characteristics, and that adjusts the tone reproduction curve; and
a tone reproduction curve transformation unit that inputs image data and that adjusts the image data based on the adjusted tone reproduction curve,
wherein an angle formed between a tangent to at least one tone reproduction curve at a point, and a line from the point to an end point is less than a threshold value, the end point is considered to be a corner of a box, the threshold value is a function of a distance from the point to a nearest wall of the corner, and the threshold value going to zero as the distance to the wall goes to zero.

8. The apparatus according to claim 7, wherein the tone reproduction curve is adjusted using gray balance.

9. The apparatus according to claim 8, wherein the tone reproduction curve is adjusted using different darkness of various colors of the image data.

10. The apparatus according to claim 7, wherein a tone reproduction curve is determined for each of various colors of the image data.

11. The apparatus according to claim 10, wherein the tone reproduction curve for each of the various colors is extended smoothly.

12. The apparatus according to claim 11, wherein a spline function is applied to extend at least one tone reproduction curve.

* * * * *